J. H. SCOTCHMER.
FISHING REEL.
APPLICATION FILED JULY 14, 1909.
948,026.
Patented Feb. 1, 1910.
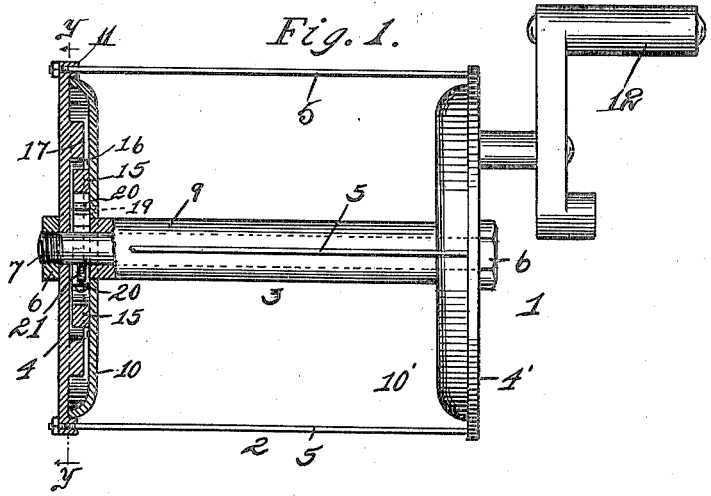
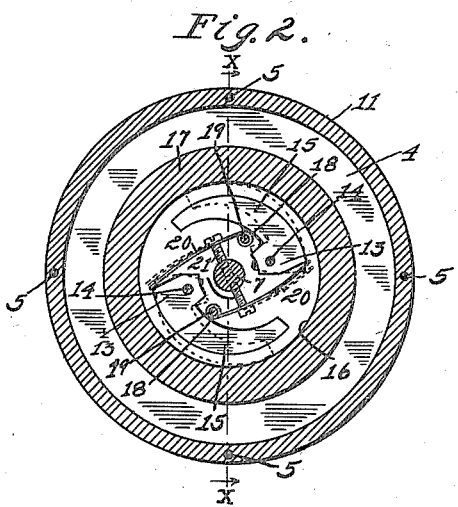
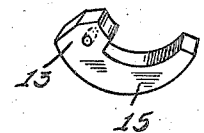
Witnesses:
C. E. Wessels
A. A. Olson
Inventor:
John H. Scotchmer
By Joshua H. Potts
his Attorney

UNITED STATES PATENT OFFICE.

JOHN H. SCOTCHMER, OF CHICAGO, ILLINOIS.

FISHING-REEL.

948,026.	Specification of Letters Patent.	Patented Feb. 1, 1910.

Application filed July 14, 1909. Serial No. 507,608.

*To all whom it may concern:*

Be it known that I, JOHN H. SCOTCHMER, a citizen of the United States, residing at Chicago, county of Cook, and State of Illinois, have invented certain new and useful Improvements in Fishing-Reels, of which the following is a specification.

My invention relates to fishing reels and more specifically to centrifugally operable brake means therefor for automatically governing the speed of line spool thereof.

The object of my invention is to provide in a fishing reel a brake device of the character mentioned adapted for arrangement at one end of the spool for coöperation with a fixed annular flange to govern the speed of rotation of the spool so as to prevent the over-running and hence snarling and tangling of the line when casting.

A further object is the provision of a device as mentioned which will be effective in operation and which will be simple of construction, hence of low cost to manufacture.

Other objects will appear hereinafter.

With these objects in view my invention consists in a speed governing brake device characterized as above mentioned and in certain details of construction and arrangement of parts all as will be hereinafter fully described and particularly pointed out in the claims.

My invention will be more readily understood by reference to the accompanying drawing forming a part of this specification and in which, Figure 1 is a front elevation of an ordinary fishing reel in which is incorporated the preferred form of my improvement, one end of the reel being shown in section, such section being taken on substantially the line *x*—*x* of Fig. 2. Fig. 2 is a section taken on substantially the line *y*—*y* of Fig. 1, and Fig. 3 is a perspective view of one of the brake members embodied in my invention, detached.

Referring now to the drawings, 1 indicates an ordinary fishing reel comprised essentially of the frame 2 and a rotatable line spool 3 mounted therein. Comprised in said frame are the usual heads 4—4' rigidly connected by connecting rods 5 the respective extremities of which are rigidly connected in said heads adjacent the peripheries thereof. Having its extremities suitably journaled in said heads, the same being locked against longitudinal movement therein by nuts 6 threaded upon the extremities thereof, is a shaft or spindle 7. The line spool 3 of the reel is comprised of the central sleeve portion 9 rigidly secured, usually by brazing, upon the shaft 7 and the concave disks 10—10' rigidly fixed to the extremities of said sleeve, the frame heads 4—4' being, as shown, formed with inwardly projecting peripheral flanges 11 overlapping the peripheral edges of said disks, the same acting as guards or shields therefor. The line spool is operated in the usual manner by means of the crank or handle 12 which is in gear connection with the shaft 7. Thus far the construction described is ordinary, no claim being made to the same, it being understood that the invention lies wholly in the brake device which is arranged for coöperation therewith and which may be incorporated in any reel of suitable design.

Having their extremities 13 pivotally mounted upon pins 14 secured in and inwardly projecting from the disk 10, preferably at opposite sides of the shaft 7 and equally distant therefrom, are similar brake devices 15 preferably segmental in form as shown, the outer edges thereof being of a curvature such that when said devices are in normal position, the same will be positioned concentric with the inner surface 16 of an annular flange 17 inwardly projecting from and preferably formed integrally with the frame head 4. Said flange 17 is concentrically arranged upon said head relative to shaft 7 and is of an inner diameter such that, upon a slight outward rocking of the free ends of said brake devices, said ends will be brought to engage said inner surface 16 of said flange, as shown in dotted lines in Fig. 2.

Having their ends 18 fixed to pins 19 secured in and inwardly projecting from the disk 10 are normally curved leaf springs 20, the same being so positioned that the free ends thereof are adapted to engage the outermost corners of the fixed extremities of the devices 15. Set screws 21 passing through perforations provided in said springs 26 for the reception thereof and having their inner ends threaded into the shaft 7 are obviously adapted to be adjusted to bring said springs into forced engagement with said devices. Said springs, with such arrangement, will evidently exert a force upon said devices tending normally to hold the same out of engagement with flange 17. As shown, the pins 19 are so positioned that the same act as a means of limiting the inward movement of the free ends of the members 15 and in engagement with which, with the construction described, the latter, when in normal position, will evidently rest.

In operation, upon the rotation of the line spool at a high rate of speed, as when casting, the free ends of the brake devices 15 because of the centrifugal force assumed thereby in such rotation will evidently be swung outwardly against the tension of the springs 20 into engagement with the stationary flange 17. Such engagement thereof because of the friction between the contacting surfaces evidently impedes or retards the rotation of said spool preventing as before stated, the overrunning of the latter with reference to the uncoiling line. By such construction the greater the speed assumed by the spool the greater will be the retarding force exerted by the brake devices upon the fixed flange, in other words the retarding force exerted will be in direct proportion with the increasing speed of the spool. By means of the set screws 21 the tension of said springs, that is the force exerted thereby upon the members 15, may evidently be accurately adjusted so as to permit of the actuation of the brake devices only upon a certain predetermined rotary speed being attained by the line spool, such adjustment being of obvious advantage.

While I have shown what I deem to be the preferable form of my brake mechanism I do not wish to be limited thereto as there might be many changes made in the details of construction and the arrangement of parts without departing from the spirit of the invention comprehended within the scope of the appended claims.

Having described my invention what I claim as new and desire to secure by Letters Patent is:

1. The combination with a fishing reel comprising a stationary frame, a shaft journaled in said frame, and a line spool carried by said shaft, of centrifugally operable brake devices mounted upon one of the disks of said spool, an annular flange formed upon said frame encircling said devices adapted to be engaged thereby, leaf springs mounted upon said disk engaging said devices for normally restraining the same from engaging said flange, and set screws extending through said springs and threaded into said shaft for adjusting the restraining tension of said springs upon said devices, substantially as described.

2. The combination, with a fishing reel comprising a stationary frame, a shaft journaled therein, and a line spool carried by said shaft, of segmental centrifugally operable brake devices mounted upon one of the disks of said spool upon opposite sides of and equally distant from said shaft, a concentrically arranged annular flange encircling said devices fixed to said frame, normally curved leaf springs mounted upon said spool disk engaging said devices for normally restraining the same from engaging said flange, and means in threaded connection in said shaft for adjusting the tension of said spring, substantially as described.

3. The combination with a fishing reel comprising a stationary frame, a shaft journaled in said frame, and a line spool carried by said shaft, of two oppositely disposed centrifugally operable brake devices pivoted on diametrically opposed pivots carried by one of the disks of said spool, an annular flange formed on said frame encircling said devices and adapted to be engaged upon outward movement thereof, posts limiting the inward movement of said brake devices, and a spring secured to each of said posts and contacting with the opposite brake device to normally retain it in its innermost position, substantially as described.

4. The combination with a fishing reel comprising a stationary frame, a shaft journaled in said frame, and a line spool carried by said shaft, of two oppositely disposed centrifugally operable brake devices pivoted on diametrically opposed pivots carried by one of the disks of said spool, an annular flange formed on said frame encircling said devices and adapted to be engaged upon outward movement thereof, posts limiting the inward movement of said brake devices, a flat leaf spring secured to each of said posts and contacting with the opposite brake device to normally retain it in its innermost position, and set screws passing through said springs and threaded into said shafts, substantially as described.

In testimony whereof I have signed my name to this specification in the presence of two subscribing witnesses.

JOHN H. SCOTCHMER.

Witnesses:
 JOSHUA R. H. POTTS,
 ARTHUR A. OLSON.